(12) United States Patent
Starr et al.

(10) Patent No.: US 6,470,415 B1
(45) Date of Patent: Oct. 22, 2002

(54) QUEUE SYSTEM INVOLVING SRAM HEAD, SRAM TAIL AND DRAM BODY

(75) Inventors: Daryl D. Starr, Milpitas; Clive M. Philbrick, San Jose, both of CA (US)

(73) Assignee: Alacritech, Inc., San Jose, CA (US)

( * ) Notice: Subject to any disclaimer, the term of this patent is extended or adjusted under 35 U.S.C. 154(b) by 0 days.

(21) Appl. No.: 09/416,925

(22) Filed: Oct. 13, 1999

(51) Int. Cl.[7] .............................................. G06F 12/00
(52) U.S. Cl. ...................................................... 711/104
(58) Field of Search ................................ 711/101, 104, 711/154, 170; 709/314; 710/52

(56) References Cited

U.S. PATENT DOCUMENTS

| | | | |
|---|---|---|---|
| 4,336,538 A | 6/1982 | Johnson et al. ............. | 364/200 |
| 4,991,133 A | 2/1991 | Davis et al. ................. | 364/900 |
| 5,056,058 A | 10/1991 | Hirata et al. ................. | 364/900 |
| 5,097,442 A | 3/1992 | Ward et al. .................... | 365/78 |
| 5,163,131 A | 11/1992 | Row et al. .................... | 395/200 |
| 5,212,778 A | 5/1993 | Dally et al. .................. | 395/400 |
| 5,280,477 A | 1/1994 | Trapp ......................... | 370/85.1 |
| 5,289,580 A | 2/1994 | Latif et al. ................... | 395/275 |
| 5,303,344 A | 4/1994 | Yokoyama et al. ......... | 395/200 |
| 5,412,782 A | 5/1995 | Hausman et al. ........... | 395/250 |
| 5,448,566 A | 9/1995 | Richter et al. .............. | 370/94.1 |
| 5,485,579 A | 1/1996 | Hitz et al. .............. | 395/200.12 |
| 5,506,966 A | 4/1996 | Ban ............................ | 395/250 |
| 5,511,169 A | 4/1996 | Suda ........................... | 395/280 |
| 5,548,730 A | 8/1996 | Young et al. ................ | 395/280 |
| 5,566,170 A | 10/1996 | Bakke et al. .................. | 370/60 |
| 5,588,121 A | 12/1996 | Reddin et al. ......... | 395/200.15 |
| 5,590,328 A | 12/1996 | Seno et al. .................. | 395/675 |
| 5,592,622 A | 1/1997 | Isfeld et al. ........... | 395/200.02 |
| 5,629,933 A | 5/1997 | Delp et al. .................. | 370/411 |
| 5,634,099 A | 5/1997 | Andrews et al. ........ | 395/200.07 |
| 5,634,127 A | 5/1997 | Cloud et al. ................ | 395/680 |
| 5,642,482 A | 6/1997 | Pardillos .................. | 395/200.2 |

(List continued on next page.)

FOREIGN PATENT DOCUMENTS

| | | |
|---|---|---|
| WO | WO 98/19412 | 5/1998 |
| WO | WO 98/50852 | 11/1998 |
| WO | WO 99/04343 | 1/1999 |
| WO | WO 99/65219 | 6/1999 |
| WO | WO 00/13091 | 3/2000 |

OTHER PUBLICATIONS

Internet pages entitled: Technical White Paper—Xpoint's Disk–to–LAN Acceleration Solution for Windows NT Server, printed Jun. 5, 1997.
Jato Technologies Internet pages entitled: Network Accelerator Chip Architecture (twelve–slide presentation), 13 pages, printed Aug. 19. 1998.
EETIMES article entitled: Enterprise system uses flexible spec, by Christopher Harrer and Pauline Shulman, dated Aug. 10, 1998, Issue 1020. 3 pages, printed Nov. 25, 1998.
Internet pages entitled: iReady About Us and iReady Products. 5 pages, printed Nov. 25, 1998.

(List continued on next page.)

Primary Examiner—Kevin L. Ellis
(74) Attorney, Agent, or Firm—Mark Lauer; Lester Wallace

(57) ABSTRACT

A device for queuing information combines the speed of SRAM with the low cost and low power consumption of DRAM, affording substantial expansion of high-speed data storage in queues without corresponding increases in costs. The queues have a variable size, and provide fast, flexible and efficient data storage via an SRAM interface and a DRAM body. The queues may hold pointers to buffer addresses or other data that allow manipulation of information in the buffers via manipulation of the queues. Particular utility for this mechanism exists in situations for which high-speed access to queues is beneficial, flexible queue size is advantageous, and/or the smaller size and lower cost of DRAM compared to SRAM is of value.

29 Claims, 5 Drawing Sheets

Microfiche Appendix Included
(1 Microfiche, 27 Pages)

U.S. PATENT DOCUMENTS

| | | | | |
|---|---|---|---|---|
| 5,664,114 A | 9/1997 | Krech, Jr. et al. | | 395/200.64 |
| 5,671,355 A | 9/1997 | Collins | | 395/200.2 |
| 5,678,060 A | 10/1997 | Yokoyama et al. | | 395/831 |
| 5,692,130 A | 11/1997 | Shobu et al. | | 395/200.12 |
| 5,699,317 A | 12/1997 | Sartore et al. | | 365/230.06 |
| 5,701,434 A | 12/1997 | Nakagawa | | 395/484 |
| 5,749,095 A | 5/1998 | Hagersten | | 711/141 |
| 5,751,715 A | 5/1998 | Chan et al. | | 370/455 |
| 5,752,078 A | 5/1998 | Delp et al. | | 395/827 |
| 5,758,084 A | 5/1998 | Silverstein et al. | | 395/200.58 |
| 5,758,089 A | 5/1998 | Gentry et al. | | 395/200.64 |
| 5,758,186 A | 5/1998 | Hamilton et al. | | 395/831 |
| 5,758,194 A | 5/1998 | Kuzma | | 395/886 |
| 5,771,349 A | 6/1998 | Picazo, Jr. et al. | | 395/188.01 |
| 5,790,804 A | 8/1998 | Osborne | | 395/200.75 |
| 5,794,061 A | 8/1998 | Hansen et al. | | 395/800.01 |
| 5,802,580 A | * 9/1998 | McAlpine | | 711/149 |
| 5,812,775 A | 9/1998 | Van Seeters et al. | | 395/200.43 |
| 5,815,646 A | * 9/1998 | Purcell et al. | | 395/163 |
| 5,878,225 A | 3/1999 | Bilansky et al. | | 395/200.57 |
| 5,930,830 A | 7/1999 | Mendelson et al. | | 711/171 |
| 5,991,299 A | 11/1999 | Radogna et al. | | 370/392 |
| 6,009,478 A | 12/1999 | Panner et al. | | 710/5 |
| 6,034,963 A | 3/2000 | Minami et al. | | 370/401 |
| 6,061,368 A | 5/2000 | Hitzelberger | | 370/537 |

OTHER PUBLICATIONS

Internet pages entitled: Smart Ethernet Network Interface Card (which Berend Ozceri is developing). 2 pages, printed Nov. 25, 1998.

Internet pages entitled : Hardware Assisted Protocol Processing (which Eugene Feinberg is working on). 1 page, printed Nov. 25, 1998.

Internet pages of XaQti Corporation entitled: Giga POWER Protocol Processor Product Preview. 4 pages, printed Nov. 25, 1998.

"Toshiba Delivers First Chips to Make Consumer Devices Internet–Ready Based on iReady Design," Press Release Oct. 14, 1998. 3 pages. (printed Nov. 28, 1998).

Internet pages from website http://www.ireadyco.com/about.html, 3 pages, downloaded Nov. 2, 1998.

60/053,240 (U.S. Provisional Application), by Jolitz et al. (listed filing date Jul. 18, 1997).

Zilog Product Brief entitled "Z85C30 CMOS SCC Serial Communication Controller", Zilog Inc., 3 pages (1997).

IReady News Archive, "Revolutionary Approach to Consumer Electronics Internet Connectivity Funded," San Jose, CA Nov. 20, 1997. 2 pages, printed Nov. 2, 1998.

IReady News Archive, "Seiko Instruments Inc. (SII) Introduces World's First Internet–Ready Intelligent LCD Modules Based on IReady Technology," Santa Clara, CA and Chiba, Japan, Oct. 26, 1998. 2 pages, printed Nov. 2, 1998.

Internet pages of Xpoint Technologies www.xpoint.com website, 5 pages, printed Dec. 19, 1997.

Internet pages entitled: Asante and 100BASE–T Fast Ethernet. 7 pages, printed May 27, 1997.

Internet pages entitled: A Guide to the Paragon XP/S–A7 Supercomputer at Indiana University. 13 pages, printed Dec. 21, 1998.

Richard Stevens, "TCP/IP Illustrated, vol. 1, The Protocols", pp. 325–326 (1994).

VT8501 Apollo MVP4 Documentation, VIA Technologies, Inc., pp. i–iv, 1–11, cover and copyright page, revision 1.3 (Feb. 1, 2000).

Internet pages entitled: Northridge/Southbridge vs. Intel Hub Architecture, 4 pages, printed Feb, 19, 2001.

Gigabit Ethernet Technical Brief, Achieveing End–to–End Performance. Alteon Networks, Inc., First Edition, Sep. 1996.

Internet pages directed to; Technical Brief on Alteon Ethernet Gigabit NIC technology, www.alteon.com, 14 pages, printed Mar. 15, 1997.

Internet pages from IReady News Archives entitled, "iReady Rounding Out management team with two key executives," 2 pages, downloaded Nov. 28, 1998.

"Toshiba Delivers First Chips to Make Consumer Devices Internet–Ready Based On iReady's Design," Press Release Oct., 1988. 3 pages, downloaded Nov. 28, 1998.

Internet pages from iReady Products, web site http://www.ireadyco.com/products,html, 2 pages, downloaded Nov. 25, 1998.

IReady News Archives, "Toshiba, iReady shipping Internet chip," 1 page, posted at 9:39 AM PT, Oct. 14, 1998.

iReady Corporation, The i–1000 Internet Tuner, Modular Internet Design System, 2 pages, date unknown.

Interprophet website, http://www.interprophet.com/technology.html, 17 pages, downloaded Mar. 1, 2000.

NEWSwatch—IReady Internet Tuner to Web Enable Devices, Nov. 5, 1996. 2 pages, printed Nov. 2, 1998.

David Lammers, EETimes, Jun. 13, 1997, Tuner for Toshiba, Toshiba taps iReady for Internet tuner. 3 pages, printed Nov. 2, 1998.

Internet pages entitled: DART Fast Application—Level Networking Via Data–Copy Aviodance, by Robert J. Walsh, 25 pages. Printed Jun. 3, 1999.

Internet pages of InterProphet entitled: Frequently Asked Questions, by Lynne Jolitz, 4 pages. Printed Jun. 14, 1999.

* cited by examiner

QUEUE SYSTEM INVOLVING SRAM HEAD, SRAM TAIL AND DRAM BODY

MICROFICHE APPENDIX

A Microfiche Appendix comprising one sheet, totaling twenty-seven frames is included herewith.

COPYRIGHT NOTICE

A portion of the disclosure of this patent document contains material that is subject to copyright protection. The copyright owner has no objection to the reproduction of the patent document or the patent disclosure in exactly the form it appears in the Patent and Trademark Office patent file or records, but otherwise reserves all copyright rights whatsoever.

TECHNICAL FIELD

The present invention relates to memory circuits for microprocessors.

BACKGROUND OF THE INVENTION

The operation of processors frequently involves temporary storage of information for later manipulation. As is well known, data may be stored for random access, or may be stored for access in an ordered fashion such as in a stack or queue. A queue stores data entries in sequential fashion, so that the oldest entry in the queue is retrieved first. The entry and removal of data in queues may be handled by a central processing unit (CPU) processing software instructions.

Such a queue system can be a bottleneck in the efficient operation of the processor. For example, a first item of information obtained from one process may need to be queued to wait for the processing of another item of information, so that both items may then be manipulated together by the processor. The queuing and dequeuing of the first item of information may require additional work of the processor, slowing the eventual processing of both items of information further. More complicated situations involving multiple operands and operations cause the queuing and dequeuing complications to multiply, requiring various locks that absorb further processing power and time. The size and complexity of a microprocessor can lead to correspondingly large and complex arrangements for storing queues.

The allocation of memory space for these queues is also challenging, as the queues can vary in length depending upon the type of operations being processed. For example, a queuing scheme for a communication system is described by Delp et al. in U.S. Pat. No. 5,629,933, in which a number of data packets are stored in first-in, first out (FIFO) order in queues that are segregated by session identity. Depending upon activity of a particular session, the number of entries in such queues could be very large or zero. In U.S. Pat. No. 5,097,442, Ward et al. teach programming a variable number into a register to store that number of data words in a FIFO memory array, up to the limited size of that array.

To distribute memory for queuing different connections, U.S. Pat. No. 5,812,775 to Van Seters et al. teaches a device for a router having a number of network connections that dedicates specific buffers to each network connection as well as providing a pool of buffers for servicing any network connection. A number of static random access memory (SRAM) queues are maintained for tracking buffer usage and allocating buffers for storage. While SRAM provides relatively quick access compared to dynamic random access memory (DRAM), SRAM memory cells are much larger than DRAM, making SRAM relatively expensive in terms of chip real estate.

SUMMARY OF THE INVENTION

The present invention provides a mechanism for queuing information that is fast, flexible and efficient. The mechanism combines the speed of SRAM with the low cost and low power consumption of DRAM, to enable significant expansion of high-speed data storage in queues without corresponding increases in costs. The queues may be manipulated by hardware or software, and may provide processing events for an event-driven processor. While the queuing mechanism of the present invention can be employed in many systems in place of conventional queues, particular utility is found where high speed access to queues is beneficial, as well for situations in which flexible queue size may be an advantage, and/or for cases where the smaller size and lower cost of DRAM compared to SRAM is of value.

DETAILED DESCRIPTION OF THE PREFERRED EMBODIMENTS

Figure 1:
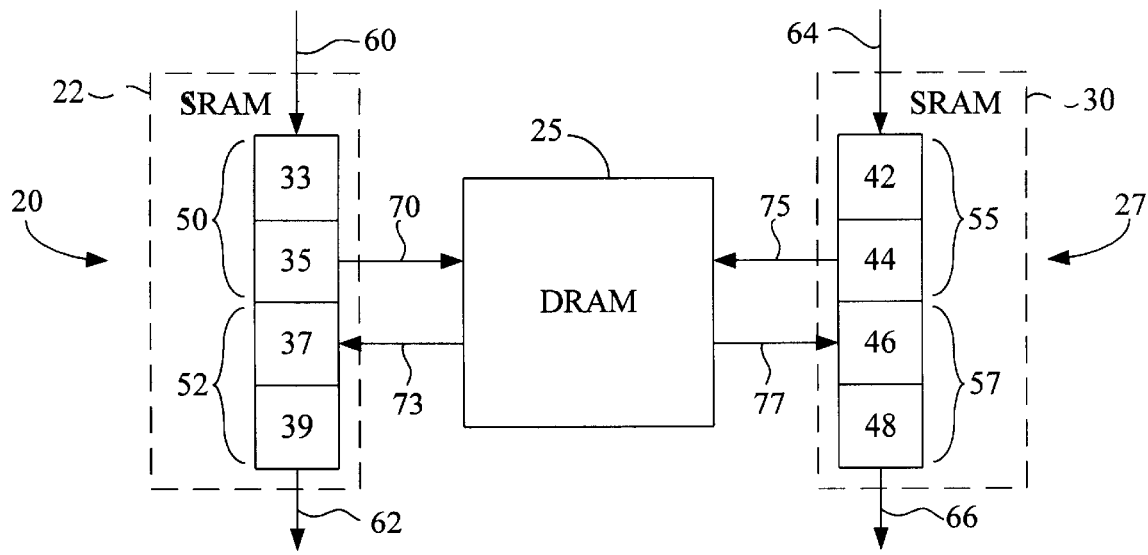
FIG. 1 is a diagram of a plurality of queues of the present invention.

FIG. 1 illustrates a plurality of hardware queues of the present invention, which may contain other such hardware queues as well. A first queue 20 is formed of a combination of SRAM 22 and DRAM 25 storage units. A second queue 27 is similarly formed as a combination of SRAM 30 and DRAM 25 storage units. The queues 20 and 27 each have an SRAM head and tail which can be used as an SRAM FIFO, and the ability to queue information in a DRAM body as well, allowing expansion and individual configuration of each queue. Connection between SRAM FIFOS 22 and 30 and DRAM 25 allows those queues 20 and 27 to handle situations in which the SRAM head and tail are fall. DRAM 25 may be formed on the same integrated circuit chip as SRAM FIFOS 22 and 30, or may be separately formed and then connected. The portion of DRAM 25 that is allocated to specific queues such as 20 and 27 may be determined during initialization of the system containing the queues. SRAM FIFOS 22 and 30 afford rapid access to the queues for enqueuing and dequeuing information, while DRAM 25 affords storage for a large number of entries in each queue at minimal cost.

SRAM FIFO 22 has individual SRAM storage units, 33, 35, 37 and 39, each containing eight bytes for a total of thirty-two bytes, although the number and capacity of these units may vary in other embodiments. Similarly, SRAM FIFO 30 has SRAM storage units 42, 44, 46 and 48. SRAM units 33 and 35 form a head 50 of FIFO 22 and units 37 and 39 form a tail 52 of that FIFO, while units 42 and 44 form a head 55 of FIFO 30 and units 46 and 48 form a tail 57 of that FIFO. Information for FIFO 22 may be written into head units 33 or 35, as shown by arrow 60, and read from tail units 37 or 39, as shown by arrow 62. A particular entry, however, may be both written to and read from head units 33 or 35, or may be both written to and read from tail units 37 or 39, minimizing data movement and latency. Similarly, information for FIFO 30 is typically written into head units 42 or 44, as shown by arrow 64, and read from tail units 46 or 48, as shown by arrow 66, but may instead be read from the same head or tail unit to which it was written. While a queue of the present invention may include only one SRAM unit, the availability of plural SRAM units can improve access to SRAM without observable latency from data movement between SRAM and DRAM.

Queue 20 may enqueue an entry in DRAM 25, as shown by arrow 70, by direct memory access (DMA) units acting under direction of a queue manager, not shown in this figure, instead of being queued in the head or tail of FIFO 22. Entries stored in DRAM 25 return to SRAM unit 37, as shown by arrow 73, extending the length and fall-through time of that FIFO. Diversion of information from SRAM to DRAM is typically reserved for when the SRAM is full, since DRAM is slower and DMA movement causes additional latency. Thus queue 20 may comprise the entries stored by the queue manager in both the FIFO 22 and the DRAM 25. Likewise, information bound for FIFO 30 can be moved by DMA into DRAM 25, as shown by arrow 75. The capacity for queuing in cost-effective albeit slower DRAM 25 is user-definable during initialization, allowing the queues to change in size as desired. Information queued in DRAM 25 can be returned to SRAM unit 46, as shown by arrow 77. Movement of information between DRAM and SRAM can be coordinated so that devices utilizing the queue experience SRAM speed although the bulk of queued information may be stored in DRAM.

The queue system of the present invention may vary in size and may be used with various devices. Such a queue system may be particularly advantageous for devices that benefit from rapid processing of large amounts of data with plural processors. A preferred embodiment described in detail below and in Verilog code in the microfiche appendix includes a queue manager, SRAM and DRAM controllers and a number of queues that may be used with a network communication device.

Figure 2:
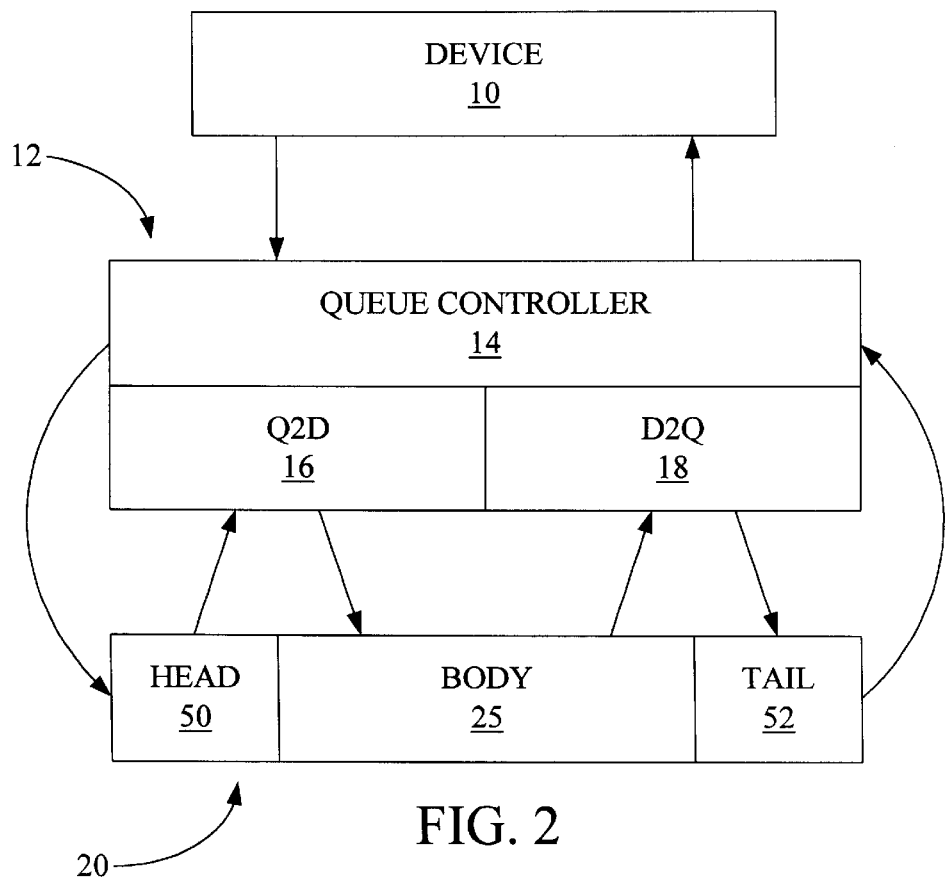
FIG. 2 is a diagram of the enqueuing and dequeuing of entries in a queue of FIG. 1.

FIG. 2 depicts the enqueuing and dequeuing of entries in queue 20 for a device 10 such as a processor. When device 10 wants to store data in a queue, information regarding that data is sent to a queue manager 12, which manages entries in multiple queues such as queue 20. Queue manager 12 includes a queue controller 14 and DMA units Q2D 16 and D2Q 18, which may be part of a number of DMA units acting under the direction of queue controller 14. DMA units Q2D 16 and D2Q 18 may be specialized circuitry or dedicated sequencers that transfer data from SRAM to DRAM and vice-versa without using the device 10. The queue controller 14 enters the data from device 10 in the head 50 of queue 20, which is composed of SRAM. Should the information be needed again shortly by device 10, the queue controller can read the entry from head 50 and send it back to device 10. Otherwise, in order to provide room for another entry in head 50, DMA unit Q2D 16 moves the entry from the SRAM head 50 to DRAM body 25. Entries are dequeued to device 10 from queue 20 in a similar fashion, with device 10 requesting controller 14 for the next entry from queue 20, and receiving that entry from tail 52 via controller 14. DMA unit D2Q 18, operating as a slave to controller 14, moves entries sequentially from body 25 to SRAM tail 52, so that entries are immediately available for dequeuing to device 10.

Figure 3:
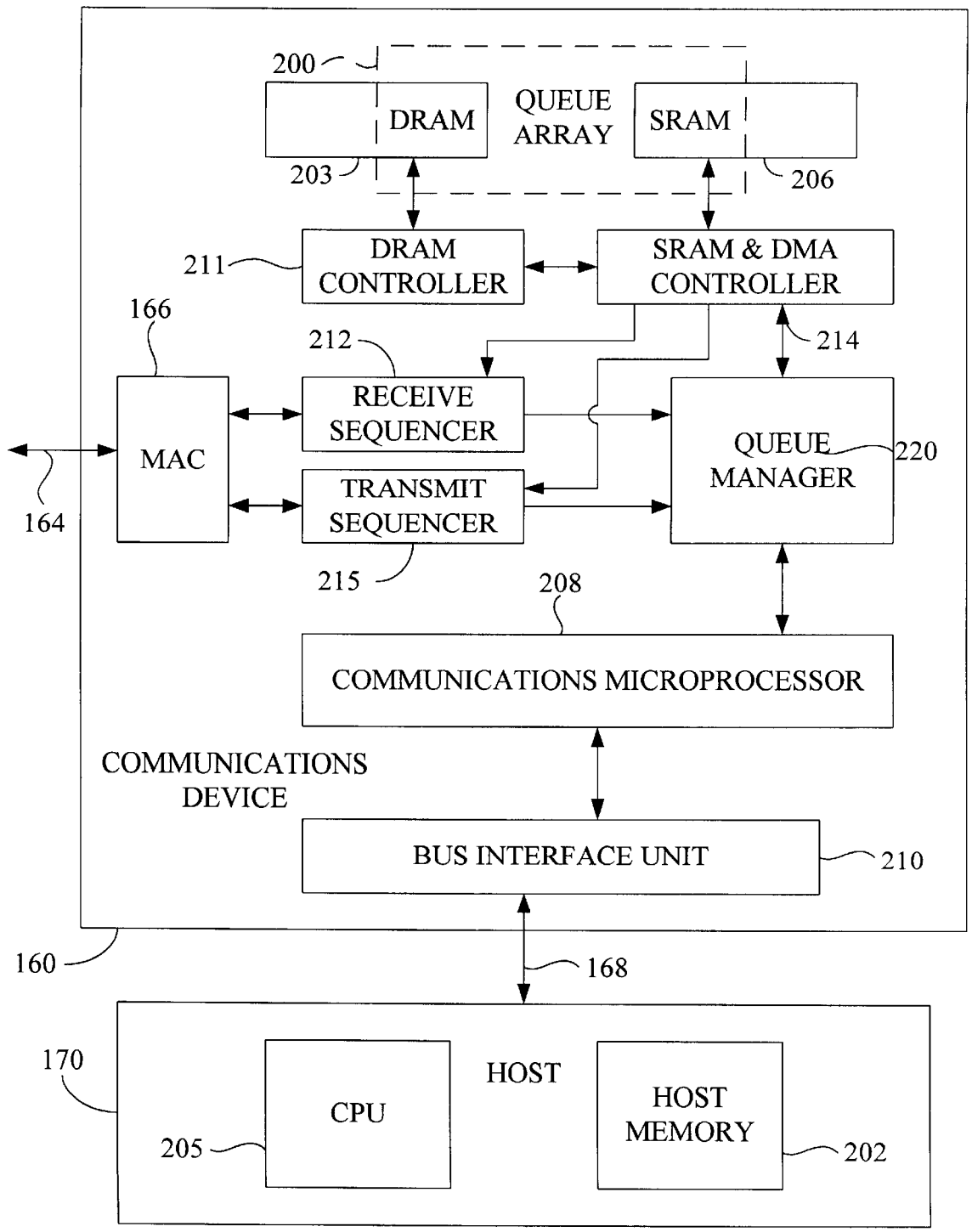
FIG. 3 is a diagram of a network computer implementation of the queue system of the present invention.

FIG. 3 focuses on a queuing system integrated within a network communication device 160 for a host 170 having a memory 202 and a CPU 205. The device 160 is coupled to a network 164 via a media access controller 166 and a conventional physical layer interface unit (PHY), not shown, and coupled to the host 170 via a PCI bus 168. The device 160 maybe provided on the host 170 motherboard or as an add-on network interface card for the host. Although a single network connection is shown in this figure for brevity, the device 160 may offer full-duplex communication for several network connections, partly due to the speed and flexibility of the queuing system. Processing of communications received from and transmitted to the network 164 is primarily handled by receive sequencer 212 and transmit sequencer 215, respectively. A queue array 200, which may include thirty-two queues in this embodiment, contains both DRAM 203 and SRAM 206, where the amount of DRAM 203 earmarked for the queue system can vary in size. The DRAM 203 and SRAM 206 are used for other functions besides the queue array 200, and may be formed as part of the device or may be separately formed and attached to the device. The device 160 includes a communications microprocessor 208 that interacts with the CPU 205 and host memory 202 across PCI bus 168 via a bus interface unit 210. A queue manager 220 helps to manage the queue array 200, via DRAM controller 211 and SRAM controller 214.

Figure 4:
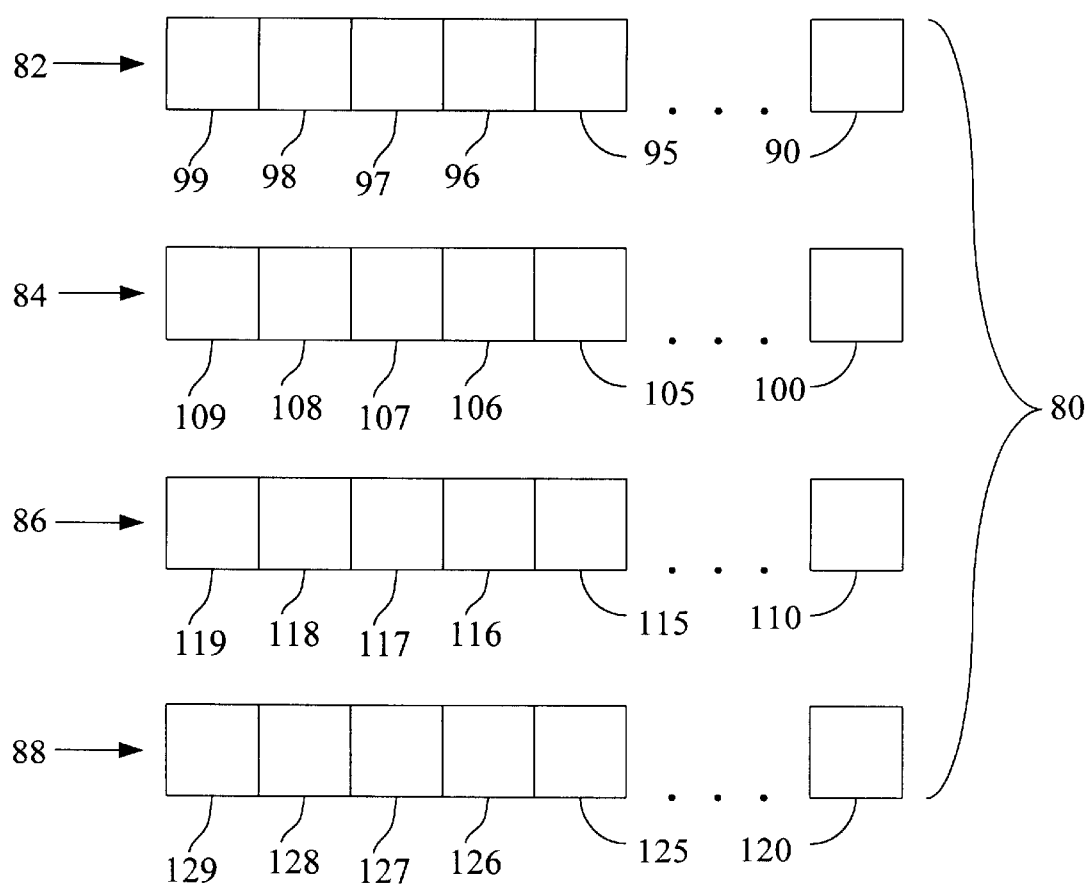
FIG. 4 is a diagram of a plurality of status registers for the queues of FIG. 3.

Status for each of the hardware queues of the queue array 200 is conveniently maintained by and accessed from a set 80 of four registers, as shown in FIG. 4, in which a specific bit in each register corresponds to a specific queue. The registers are labeled Q-Out_Ready 82, Q-In_Ready 84, Q-Empty 86 and Q-Full 88, and for the thirty-two queue embodiment the registers each have thirty-two bits. If a particular bit is set in the Q-Out_Ready register 82, the queue corresponding to that bit contains information that is ready to be read, while the setting of the same bit in the Q-In_Ready register 84 means that the queue is ready to be written. Similarly, a positive setting of a specific bit in the Q-Empty register 86 means that the queue corresponding to that bit is empty, while a positive setting of a particular bit in the Q-Full register 88 means that the queue corresponding to that bit is full. Q-Out_Ready 82 contains bits zero 90 through thirty-one 99 in the thirty-two queue embodiment, including bits twenty-seven 95, twenty-eight 96, twenty-nine 97 and thirty 98. Q-In_Ready 84 contains bits zero 100 through thirty-one 109, including bits twenty-seven 105, twenty-eight 106, twenty-nine 107 and thirty 108. Q-Empty 86 contains bits zero 110 through thirty-one 119, including bits twenty-seven 115, twenty-eight 116, twenty-nine 117 and thirty 118, and Q-full 88 contains bits zero 120 through thirty-one 129, including bits twenty-seven 125, twenty-eight 126, twenty-nine 127 and thirty 128.

Figure 5:
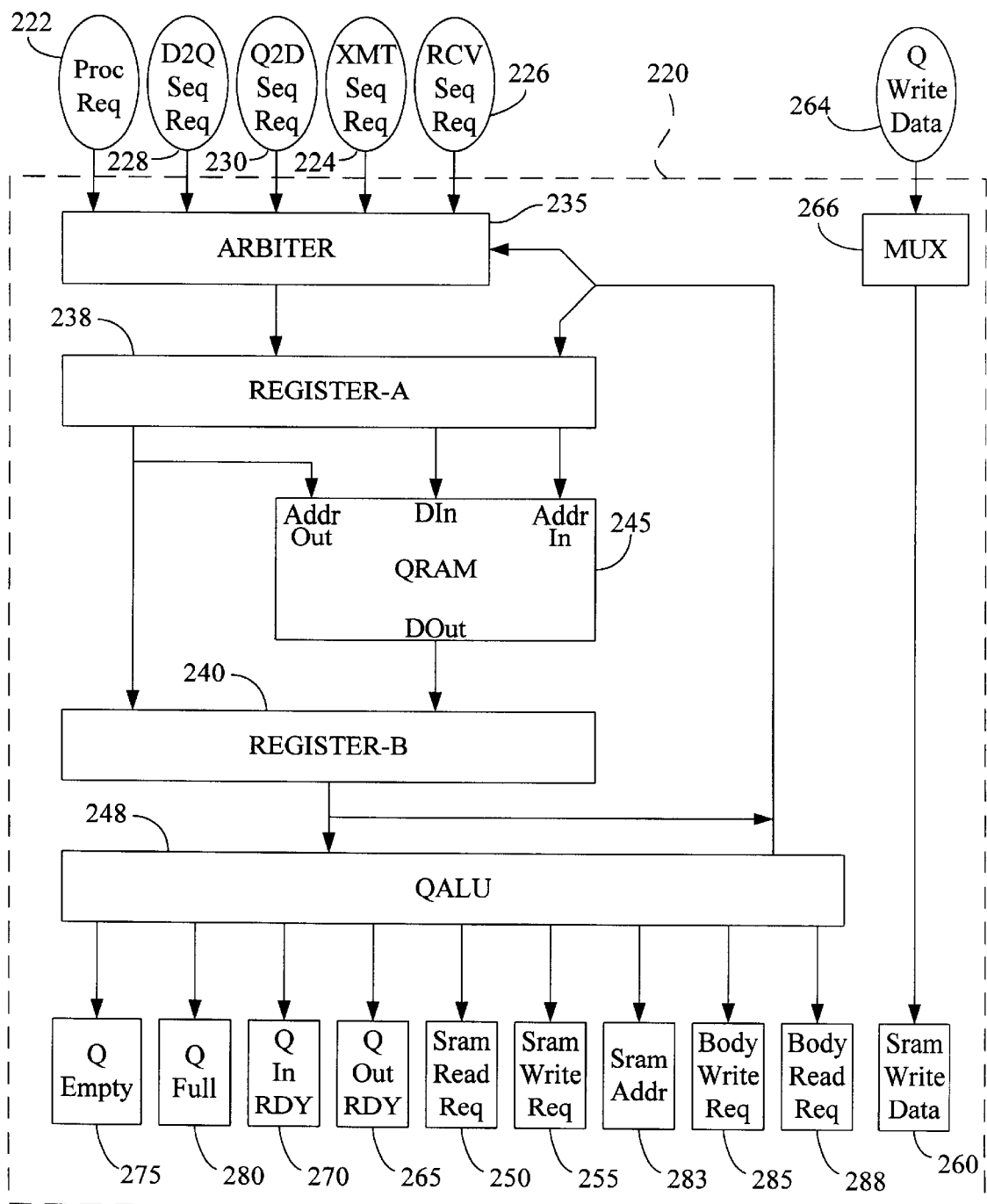
FIG. 5 is a diagram of a queue manager that manages movement of queue entries between various queues in the queue system of FIG. 3.

Operation of the queue manager 220, which manages movement of queue entries between SRAM and the microprocessor, the transmit and receive sequencers, and also between SRAM and DRAM, is shown in more detail in FIG. 5. Requests, which utilize the queues, include Processor Request 222, Transmit Sequencer Request 224, and Receive Sequencer Request 226. Other requests for the queues are DRAM to SRAM Request (D2Q Seq Req) 228 and SRAM to DRAM Request (Q2D Seq Req) 230, which operate on behalf of the queue manager in moving data back and forth between the DRAM and the SRAM head or tail of the queues. Determining which of these various requests will get to use the queue manager in the next cycle is handled by priority logic Arbiter 235. To enable high frequency operation the queue manager is pipelined, with Register-A 238 and Register-B 240 providing temporary storage, while Status Registers Q_Out_Ready 265, Q_In_Ready 270, Q_Empty 275, and Q_Full 280 maintain status until the next update. The queue manager reserves even cycles for SRAM to DRAM, DRAM to SRAM, receive and transmit sequencer requests and odd cycles for processor requests. Dual ported QRAM 245 stores variables regarding each of the queues, the variables for each queue including a Head Write Pointer, Head Read Pointer, Tail Write Pointer and Tail Read Pointer corresponding to the queue's SRAM condition, and a Body Write Pointer, a Body Read Pointer and a Queue Size Variable corresponding to the queue's DRAM condition and the queue's size.

After Arbiter 235 has selected the next operation to be performed, the variables of QRAM 245 are fetched and modified according to the selected operation by a QALU 248, and an SRAM Read Request 250 or an SRAM Write Request 255 may be generated. The four queue manager registers Q_Out_Ready 265, Q_In_Ready 270, Q_Empty 275, and Q_Full 280 are updated to reflect the new status of the queue that was accessed. The status is also fed to Arbiter 235 to signal that the operation previously requested has been fulfilled, inhibiting duplication of requests. Also updated are SRAM Addresses 283, Body Write Request 285 and Body Read Requests 288 which are used by DMA CONTROLLER 214 while moving data between SRAM head and DRAM body as well as SRAM tail and DRAM body. If the requested operation was a write to a queue, data as shown by Q Write Data 264, are selected by multiplexor 266, and pipelined to SRAM Write Data register 260. The SRAM controller services the read and write requests by reading the tail or writing the head of the accessed queue and returning an acknowledge. In this manner the various queues can be utilized and their status updated.

The array of queues 200 contained within the communication device 160 may include thirty-two queues, for example. At the beginning of operation the device memory is divided into a number of large (2 kilobyte) and small (256 byte) buffers, and pointers denoting the addresses of those buffers are created. These pointers are placed in a large free buffer queue and a small free buffer queue, respectively. Over time, as various operations are executed, these free buffer queues offer a list of addresses for buffers that are available to the communication device 160 or other devices. Due to the potential number of free buffer addresses, these free buffer queues commonly include appreciable DRAM 203 in order to provide sufficient room for listing the buffers available to any device in need of a usable buffer. Note that the queue entries need not be pointers but may, for example, comprise thirty-two bits of control information that is used for communicating with or controlling a device. Another example of a variable capacity queue that may contain a significant amount of DRAM 203 is a trace element queue, which can be used to trace various events that have occurred and provide a history of those events, which may for instance be useful for debugging.

Figure 6:
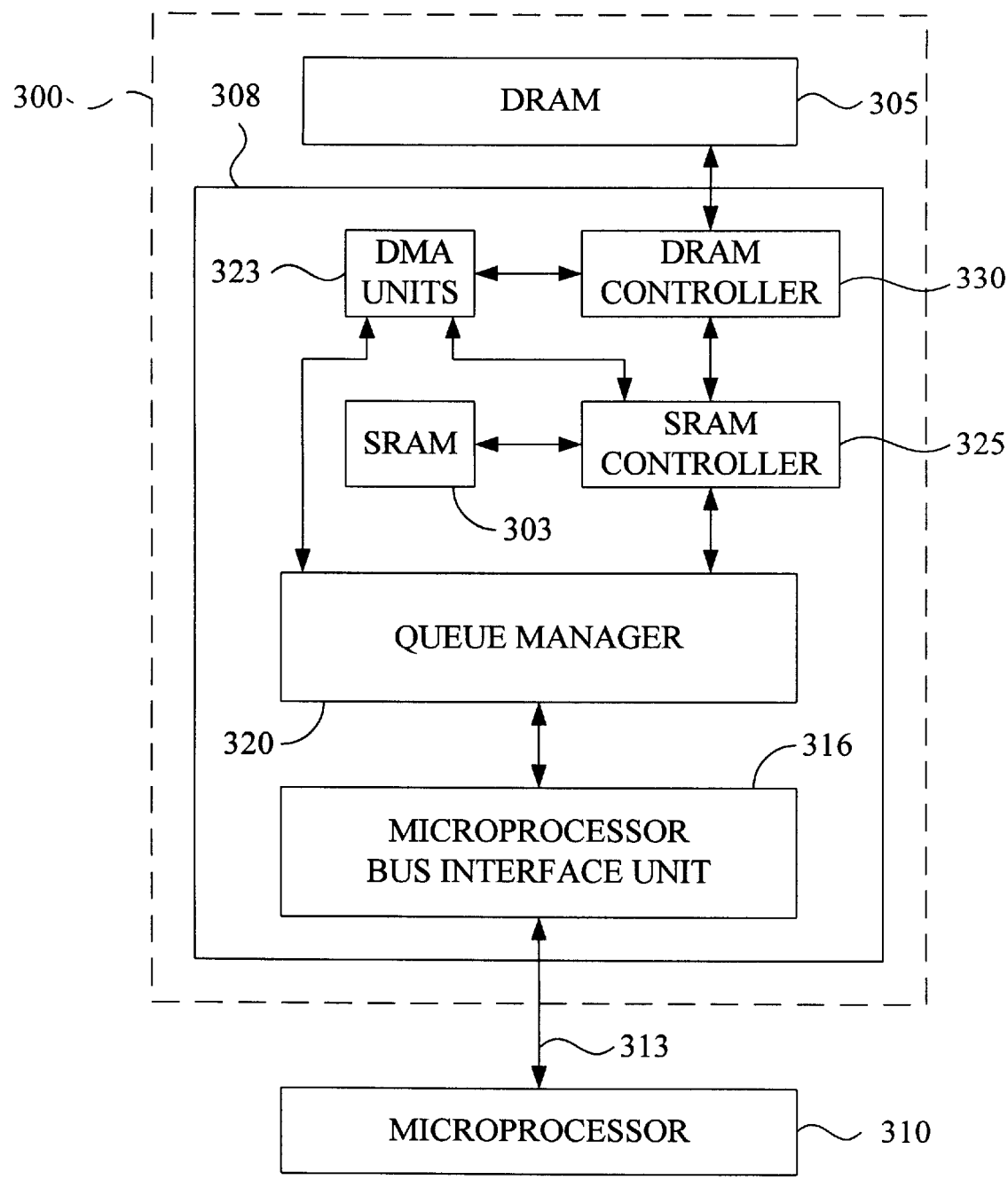
FIG. 6 is a diagram of a queue system that may be provided on a card that plugs into a computer or other device.

FIG. 6 shows a queue system 300 that may be provided on a card that can plug into a computer or similar device. The queue system contains an array of queues that may include both SRAM 303 and DRAM 305. The queue system may be formed as a single ASIC chip 308, with the exception of DRAM 305. The DRAM 305 may be provided on the card as shown or may exist as part of the computer or other device and be connected to the card by a bus. The system 300 may connect to a microprocessor 310 via a microprocessor bus 313, with a microprocessor bus interface unit 316 translating signals between the microprocessor bus and a queue manager 320. The queue manager 320 controls DMA units 323 and an SRAM controller 325 that can also control the DMA units 323. SRAM controller 325 and DMA units 323 can also interact with a DRAM controller 330, manages and maintains information in DRAM 305.

While the above-described embodiments illustrate several implementations for the queue system of the present invention, it will be apparent to those of ordinary skill in the art that the present invention may be implemented in a number of other ways encompassed by the scope of the following claims. Examples of such implementations include employment for network routers and switches, controllers of peripheral storage devices such as disk drives, controllers for audio or video devices such as monitors or printers, network appliance controllers and multiprocessor computers.

What is claimed is:

1. An information storage device comprising:
   a hardware storage queue configured for storage of data in a sequential order, said queue containing an SRAM storage mechanism coupled to a DRAM storage mechanism such that said data is retrieved from said queue in said sequential order, wherein said queue has a head and a tail formed of said SRAM storage mechanism and a body formed of said DRAM storage mechanism.

2. The device of claim 1 wherein said DRAM storage mechanism has a variable storage capacity.

3. The device of claim 1 wherein said SRAM storage mechanism is an interface for said DRAM storage mechanism.

4. The device of claim 1 wherein all of said data being stored in said DRAM storage mechanism was previously stored in said SRAM storage mechanism.

5. The device of claim 1 wherein said data includes a first pointer to a first memory buffer, a second pointer to a second memory buffer and a third pointer to a third memory buffer, said first pointer being stored in said head, said second pointer being stored in said body, and said third pointer being stored in said tail.

6. The device of claim 5 further comprising a queue manager configured for managing movement of said data between said SRAM storage mechanism and said DRAM storage mechanism.

7. The device of claim 6 further comprising a plurality of DMA units controlled by said queue manager for moving said data between said SRAM and DRAM storage mechanisms.

8. The device of claim 7, wherein said queue manager and said DMA units maintain a plurality of information storage queues, each of said information storage queues including a head formed of said SRAM storage mechanism, a body formed of said DRAM storage mechanism, and a tail formed of said SRAM storage mechanism.

9. A system for arranging information for a device, the system comprising:
   a DRAM array including a number of buffers for storing data, and
   an information storage queue containing pointers to said buffers, said queue having a body disposed in said DRAM array, said queue having a head disposed in an SRAM memory, said queue having a tail disposed in said SRAM memory.

10. The system of claim 9 wherein said queue is a part of an array of queues having SRAM heads, SRAM tails, and DRAM bodies.

11. The system of claim 10 further comprising a queue manager, said queue manager managing said queues by managing a movement of said pointers into said head, and from said head to said body, and from said body to said tail, and out of said tail.

12. The system of claim 11 further comprising a plurality of registers for maintaining a status of said queues.

13. The system of claim 12 wherein each of said registers has a bit corresponding to one of said queue, said bit indicating a status of said one queue.

14. The system of claim 9 wherein the device includes a plurality of processors, and said queue provides a communication mechanism between said processors.

15. A queue for storing information for a processor, the queue comprising:
a head including a first SRAM storage unit,
a tail including a second SRAM storage unit, and
a body including a DRAM storage unit, wherein a series of entries are stored in a sequential order in said head, body and tail, such that said entries are retrieved by the processor in said sequential order.

16. A network communication device adapted for communication via a network, comprising:
static memory comprising a queue head and a queue tail;
dynamic memory comprising a queue body;
a receive device that receives a network communication from the network;
a processor; and
a queue manager that maintains a first queue and a second queue, the second queue being a free buffer queue, the first queue comprising the queue head, the queue tail, and the queue body, the queue manager receiving from the receive device a request to perform an operation on the first queue, the queue manager receiving a request from the processor to perform an operation on the first queue.

17. The network communication device of claim 16, wherein the receive device is a receive sequencer.

18. The network communication device of claim 17, wherein the free buffer queue includes a plurality of entries, each entry of the free buffer queue pointing to a buffer in a memory.

19. The network communication device of claim 18, wherein the queue manager receives a request to write a head entry to the first queue, and wherein in response the queue manager returns an acknowledge signal.

20. The network communication device of claim 19, wherein the queue manager includes an arbiter, the arbiter determining which of a plurality of requests received by the queue manager will be executed by the queue manager next.

21. The network communication device of claim 20, wherein there are first cycles and second cycles, wherein on the first cycles the queue manager does not handle requests from the receive device, and wherein on the second cycles the queue manager does not handle requests from the processor.

22. The network communication device of claim 16, further comprising a plurality of memory buffers, the first queue storing a queue entry, the queue entry including a pointer to one of the plurality of memory buffers.

23. The network communication device of claim 22, wherein the queue entry includes control information for controlling a device.

24. The network communication device of claim 16, wherein the receive device, the processor, the static memory and the queue manager are integrated on the same integrated circuit chip.

25. The network communication device of claim 16, wherein the queue manager is pipelined.

26. The network communication device of claim 16, wherein the queue manager comprises means for storing an indication of whether the queue is empty.

27. A network communication device adapted for communication via a network, comprising:
static memory comprising a queue head and a queue tail;
dynamic memory comprising a queue body;
a receive sequencer that receives a network communication from the network;
a processor; and
means for maintaining a queue, the queue comprising the queue head, the queue tail, and the queue body, the means also being for receiving from the receive sequencer a request to perform an operation on the queue, the means receiving a request from the processor to perform an operation on the queue.

28. The network communication device of claim 27, wherein the network communication device is coupled to a host computer, the means including a queue manager and a plurality of DMA units coupled to the queue manager, the queue manager also including means for storing a status of the queue.

29. The network communication device of claim 27, wherein the network communication device includes a plurality of memory buffers, and wherein a plurality of queue entries is stored in the queue, each of the queue entries including a pointer to one of the memory buffers, the means also maintaining a second queue, the second queue being a free buffer queue.

* * * * *